US008755281B2

(12) United States Patent
He et al.

(10) Patent No.: US 8,755,281 B2
(45) Date of Patent: Jun. 17, 2014

(54) CONSTANT WINDOW BACK-OFF METHOD FOR MULTIPLE ACCESS IN WIRELESS LOCAL AREA NETWORKS

(75) Inventors: Yong He, Beijing (CN); Xiao-Jun Ma, Beijing (CN); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 38 days.

(21) Appl. No.: 13/320,616

(22) PCT Filed: May 18, 2010

(86) PCT No.: PCT/US2010/001468
§ 371 (c)(1),
(2), (4) Date: Nov. 15, 2011

(87) PCT Pub. No.: WO2010/138162
PCT Pub. Date: Dec. 2, 2010

(65) Prior Publication Data
US 2013/0148501 A1 Jun. 13, 2013

(30) Foreign Application Priority Data
May 26, 2009 (EP) .................................. 09305480

(51) Int. Cl.
*G01R 31/08* (2006.01)
(52) U.S. Cl.
USPC .......................................................... 370/235
(58) Field of Classification Search
USPC .............. 370/229, 230, 230.1, 234, 235, 252, 370/310
See application file for complete search history.

(56) References Cited

U.S. PATENT DOCUMENTS

| 6,278,691 | B1* | 8/2001 | Ohyama et al. | 370/235 |
|---|---|---|---|---|
| 2005/0083850 | A1* | 4/2005 | Sin et al. | 370/252 |
| 2006/0034199 | A1* | 2/2006 | Chu et al. | 370/310 |
| 2008/0225728 | A1* | 9/2008 | Plamondon | 370/237 |
| 2009/0052426 | A1* | 2/2009 | Perraud | 370/338 |

(Continued)

FOREIGN PATENT DOCUMENTS

| EP | 1296484 | 3/2003 |
|---|---|---|
| EP | 2106166 | 9/2003 |

OTHER PUBLICATIONS

Hui Ma et al., "Contetnion Window and Transmission Opportunity Adaptation for Dense IEEE 802.11 WLAN Based on Loss Differentiation," May 19, 2008 IEEE, Piscataway, NJ pp. 2555-2560.
Search Report Dated Jul. 21, 2010.

(Continued)

*Primary Examiner* — Anh-Vu Ly
*Assistant Examiner* — Gustavo Lopez-Vargas
(74) *Attorney, Agent, or Firm* — Robert D. Shedd; Jerome G. Schaefer (57) ABSTRACT

A method and apparatus are described including determining a target congestion index, determining a congestion index based on information from a last back-off round, comparing the target congestion index with the congestion index, performing one of increasing a triggering set size by a first factor and decreasing the triggering set size by a second factor responsive to the comparison, determining if a communications medium is idle, adjusting a back-off counter responsive to the third determining act, determining if the back-off counter is equal to a triggering point in the triggering set and transmitting data responsive to the fourth determining act.

12 Claims, 6 Drawing Sheets

(56) References Cited

U.S. PATENT DOCUMENTS

2009/0296581 A1* 12/2009 Mekkattuparamban
 et al. .............................. 370/235
2009/0303882 A1* 12/2009 Tanaka et al. ................. 370/237
2011/0044169 A1* 2/2011 Liu ............................... 370/235

OTHER PUBLICATIONS

Xia, et al. "Adaptive backoff algorithm based on network congestion in multi-hop wireless Ad Hoc networks." Jul. 2007 Software Engineering, Artificial Intelligence, Networking, and Parallel/Distributed Computing. SNPD 2007. Eighth ACIS International Conference on. vol. 3, pp. 319-324. IEEE, 2007.

* cited by examiner

CONSTANT WINDOW BACK-OFF METHOD FOR MULTIPLE ACCESS IN WIRELESS LOCAL AREA NETWORKS

CROSS-REFERENCE TO RELATED APPLICATIONS

This application claims the benefit, under 35 U.S.C. §365 of International Application PCT/US2010/001468, filed May 18, 2010, which was published in accordance with PCT Article 21(2) on Dec. 2, 2010 in English and which claims the benefit of European patent application No. 09305480.7, filed May 26, 2009.

FIELD OF THE INVENTION

The present invention relates to wireless communications in general and, in particular, to a control method for providing near optimal throughput while reducing collisions and increasing fairness in media access control (MAC) level communications over wireless local area networks (WLANs).

BACKGROUND OF THE INVENTION

In multicast/broadcast applications, data are transmitted from a server to multiple receivers over wired and/or wireless networks. Herein, a "/" is used to indicate alternative names for the same or similar components. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. The timing of channel access in the BEB algorithm is randomized by setting the slot counter to a random integer selected from contention window [0, CW] in each back-off cycle, and CW doubles upon failed data transmissions in last back-off cycle. Here a back-off cycle is a procedure where the back-off slot counter decrements down from an initial maximal value to zero. The simplicity and good performance of BEB contribute to the popularity of IEEE 802.11 DCF/EDCA.

However, as demonstrated by both practical experience and theoretical analysis, the BEB algorithm has some deficiencies. First, the collision probability for a transmission attempt increases exponentially with the number of active stations in the network, which significantly impairs the network throughput for large-scale and/or densely deployed networks. Second, the medium access delay cannot be bounded and the jitter is variable, which may not be suitable for multimedia applications. Third, the opportunity for medium access is not fair among stations. That is, a given station may gain access to the communication medium and get served for a long time. This results in other stations having to greatly defer their access to the medium. Moreover, it turns out that the use of doubling the contention window upon failed transmissions appears to give more transmission opportunities to these successful stations.

Some concepts/terms that may benefit the understanding of the present invention are provided. A frame is a unit of data. That is, data can be packaged in packets or frames or any other convenient format. As used herein a frame is used to indicate data packaged in a format for transmission. A back-off round/stage/cycle is a procedure in which the back-off slot counter counts down from an initial value (maximum) to zero. When the counter reaches zero, a new transmission is attempted. One frame transmission may involve multiple back-off rounds/stages (because of unsuccessful transmission attempts). As used herein a time slot represents a continuous time period during which the back-off slot counter is frozen. It may refer to either a fixed time period (usually several microseconds) sufficient for the physical layer to perform the carrier sensing once, or a varying time period (usually between hundreds of microseconds to several milliseconds, depending on the length of the packet and physical data rate) when a frame is being transmitted over the shared medium. In a network with shared medium, each station freezes or decreases its back-off slot counter based on the resulting status of the physical or virtual carrier sensing of the medium. Hence, because of the shared nature of the medium, the slot count changes are aligned among the stations. The time slot can be used as a basic time unit to make the entire procedure discrete. Positive integers $n=1, 2, 3, \ldots, N$ are used to indicate the $1^{st}, 2^{nd}, 3^{rd}, \ldots, N^{th}$ time slot, and $I_n$ is used to indicate the status of the shared medium at the nth slot, for example, $I_n=1$ when busy and $I_n=0$ otherwise. The back-off slot count of station i at the nth time slot is denoted as $slot_i(n)$.

In Application Serial Number PCT/US09/001,855, a relaxed deterministic back-off (R-DEB) method was described to overcome issues such as backward compatibility and dependability that are inherent in the deterministic back-off (DEB) method. The R-DEB method selects the back-off slot count in as deterministic a way as possible to reduce or avoid network collisions. The R-DEB method also introduces randomness to this procedure to preserve the flexibility and easy deployment feature of the conventional random back-off methods such as the BEB (binary exponential back-off) method. Hence, the R-DEB method made a compromise between the network efficiency and flexibility, and can be viewed as a combination of the DEB algorithm and BEB algorithm. The initial motivation of the R-DEB algorithm was to adapt the deterministic back-off for video transport systems while maintaining backward compatibility with the previous standards.

The R-DEB operates as follows. A back-off round starts when a station resets its back-off slot count slot(n) to the fixed number M (note that here n is a variable on the timeline). Once it is determined by the physical carrier sensing procedure that the sharing medium is idle for a time slot, the station decreases its back-off slot count by one. If this new slot count satisfies the transmission triggering condition (that is, the new slot count equals one of the elements of the triggering set $Q_T$, e.g., slot(n)=k). The node/station/client device/mobile device/mobile terminal will get an opportunity to initiate a data transmission (hence "triggering a transmission"). If no frame is to be sent at this time, the node forgoes the opportunity and continues decreasing its slot count. The result of the data transmission determines whether or not the element k should further remain in the triggering set: if there was a successful transmission then this triggering element remain in the triggering set; if there an unsuccessful data transmission then, with a probability p, a triggering element substitution procedure will be initiated that replaces the old element k with a new one k' from the interval [0, M]. The R-DEB method included a method and apparatus for selecting an element from the interval [0, M−1] for inclusion in the triggering set $Q_T$ to reduce network collisions. It should be noted that a station can be a computer, laptop, personal digital assistant (PDA), dual mode smart phone or any other device that can be mobile.

However, further investigation of the R-DEB method has shown that the size of triggering set $|Q_T|$ has significant effect on system performance. It is easy for one to realize that $|Q_T|$ should be set to a small value (have a small number of triggering elements) when congestion occurs in the network, and $|Q_T|$ should be enlarged when sporadic traffic is observed in the network.

EP Application EP 09305479.9 filed 26 May 2009 addressed this problem. First, when a system achieves optimal performance was discussed, then a control method and apparatus to improve the system performance by adaptively adjusting the size of trigger set upon the observed sparseness was described. The throughput of the R-DEB method was analyzed and it was shown that the size of triggering set could be adjusted to achieve optimal system throughput. Based on this analysis, a control method and apparatus to have the size of triggering set controlled around the optimal point, which gave maximized network throughput for the system was described. This control method adjusted the size of triggering set adaptively to the observed network sparseness. In addition, how to adjust the size of triggering set based on some other factors, such as the amount of data in the transmission buffer and network fairness was also discussed. The invention showed that the triggering set could be adaptively maintained with the evolution of network dynamics to achieve better system performance as well as describing a method and apparatus for adaptively adjusting the triggering set with the evolution of network dynamics to achieve better system performance.

A novel method that seeks to improve the IEEE 802.11 system is described herein. The method of the present invention is directed towards optimal performance even in densely populated/deployed areas. In this approach, rather than having only one transmission opportunity in each back-off cycle as traditional random back-off methods do, each station is allowed to have multiple transmission opportunities in each back-off cycle. Each transmission opportunity corresponds to a triggering point (an event from the triggering set) maintained by the station, and randomization of channel access is achieved by randomly selecting these triggering points from a constant/fixed back-off window. By controlling the number of triggering points adaptively responsive to the network congestion level, congestion avoidance is automatically achieved and the system performance oscillates around the optimal point.

SUMMARY OF THE INVENTION

Herein, the issue of multiple access in IEEE 802.11 wireless networks will be revisited. A new perspective on the random back-off mechanisms is provided. Unlike the conventional methods that adjust the contention window dynamically to the network congestion level, the method of the present invention controls the number of transmission opportunities in each back-off cycle adaptively responsive to the congestion level to allow the system work around the optimal point. The control method of the present invention performs locally and it does not need to estimate the number of contending stations as conventional methods usually do. Simulation results show that the method of the present invention provides near-optimal performance compared with conventional back-off methods.

A method and apparatus are described including determining a target congestion index, determining a congestion index based on information from a last back-off round, comparing the target congestion index with the congestion index, performing one of increasing a triggering set size by a first factor and decreasing the triggering set size by a second factor responsive to the comparison, determining if a communications medium is idle, adjusting a back-off counter responsive to the third determining act, determining if the back-off counter is equal to a triggering point in the triggering set and transmitting data responsive to the fourth determining act.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Unlike conventional random back-off methods that have a contention window that varies over time, the contention window in the method of the present invention is invariant with the network evolution. Thus, the method of the present invention is called constant window back-off (CWB) herein. However, a problem arises—how can there be optimal channel utilization when the number of contending stations, which is usually assumed to be unknown to the back-off method, changes over time? Note that a contention window only works well for a certain number of contending stations. When the contention window is far from the optimal size, the system performance degrades to suboptimal.

In CWB, this problem is solved by an approach that, instead of fixing the unique transmission opportunity in a back-off cycle to the last time slot (where the back-off slot counter reaches zero), multiple transmission opportunities are allowed in a back-off cycle for data delivery. One or more critical points in the middle of a back-off cycle are chosen as the triggers to transmit data. These critical points are called triggering points (TPs) herein and the set of all TPs in a back-off cycle is called the triggering set (TS) of this station, denoted as $Q_T$. Suppose stations in the network share the same constant back-off window (M), then each station has a total of M time slots in a back-off cycle. A station can choose a proper number of time slots from the M slots to send data. Let $slot_i(n)$ represent the value of back-off slot counter of station i at the nth time slot, then the condition for triggering data transmission should be If $\exists e \in Q_T$, $slot_i(n)=e$, then send data.

Otherwise, leave this time slot idle.

In other words, when station i decrements its slot count down to e, $e \in Q_T$, it can initiate a new data transmission attempt. If $|Q_T|>1$, then with the decreasing of the back-off slot count from the maximum value M−1 to the minimum value 0. There is a correlation between the slot count and back-off window. When the back-off window is M, then the back-off slot count will decrease from M−1 to 0, where it has exactly M time slots in a back-off cycle.) the station can have multiple opportunities to trigger frame transmissions, as long as the slot count matches an element of the triggering set $Q_T$. Note that in conventional back-off methods, a station usually has to decrement its back-off slot counter to zero before it is allowed to initiate a frame transmission. In CWB, a station can be granted multiple opportunities for frame transmissions in the middle of the slot counter decrementing process. Moreover, in CWB a new round of back-off cycle is restarted by setting the initial slot counter to a deterministic value M−1 rather than a random value as conventional methods usually do.

A triggering point k is an integer randomly selected from the interval [0, M−1] at the beginning of each back-off cycle. As long as two TPs of separate stations correspond to different time slots on the sharing medium's timeline, both stations can have collision-free channel access. However, if two TPs correspond to the same time slot on the timeline, a collision occurs. Obviously, the collision probability depends on the back-off window size M and the total number of competing TPs in the network. The collision probability is analyzed below.

Both CWB and BEB multiplex the sharing medium by randomizing the timing of channel access so as to reduce the collision probability. However, CWB achieves randomization by a completely different approach from BEB. In CWB, each station has the same initial slot counter as M−1 but the triggering point is randomized between the interval [0, M−1]. In BEB, each station has randomized the initial slot counter in the interval [0, CW] but the triggering point is fixed at zero. Such a difference leads to different behaviors in response to network congestion. CWB avoids congestion by controlling the number of TPs in $Q_T$, while BEB avoids congestion by controlling the size of back-off window CW.

Consider a cell with L stations sharing the same back-off window M. Each station has a triggering set $Q_{Ti}$. The size of the triggering set is expressed as $|Q_{Ti}|$. The operation of CWB can be modeled by a service ring with M slots, labeled from 0 to M−1 (shown in FIG. 1). Each TP in the triggering set corresponds to a slot in the ring. The system maintains a pointer cycling around the ring. Once the pointer reaches a slot corresponding to a station's TP, then this station has an opportunity to transmit data. The selection of a TP is equivalent to selecting a slot from the ring. $|Q_{Ti}|$ defines the number of slots selected by station i from the ring. Each TP in $Q_{Ti}$ corresponds to a slot in the ring.

Figure 1:
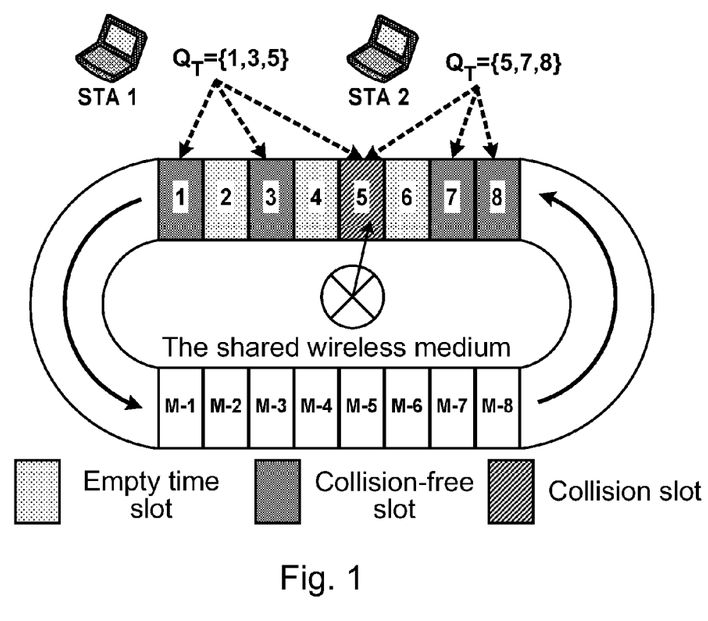
FIG. 1 is a schematic diagram of the service ring model of the constant window back-off (CWB) method of the present invention.

Define N as the total number of TPs in the network in a back-off cycle, $N=|Q_{T1}|+|Q_{T2}|+\ldots+|Q_{TL}|$, and use the term $\Omega$ to represent all slots in the service ring, $|\Omega|=M$. There are three type of slots in $\Omega$ depending on the number of TPs selecting a slot: empty slot, which is selected by no TP; collision-free slot, which is selected by exactly one TP; and collision slot, which is selected by two or more TPs. A collision-free slot is a slot that carries data in the present system while a collision slot corresponds to a network collision. Denote X as the set of collision-free times slots in $\Omega$. To compute the probability that there are exactly k collision-free time slots in $\Omega$, when N TPs are used for channel access, expressed as $P_{N,M}\{|X|=k\}$.

$$P_{N,M}\{|X|=k\} = \sum_{j=k}^{N}(-1)^{j-k}\binom{N}{j}\binom{j}{k}\frac{M!(M-j)^{N-j}}{(M-j)!M^N} \quad (1)$$

Now the probability of success of a transmission attempt given that N TPs are present in the network is derived as $$P_{succ}(N,M) = \sum_{k=1}^{N}\frac{k}{N} \cdot P_{N,M}\{|X|=k\} \quad (2)$$

The collision probability is then $$P_{coll}(N,M)=1-P_{succ}(N,M) \quad (3)$$

Define $T_s$ as the average time the medium is sensed busy (i.e., the duration that a frame transmission sequence lasts) for a successful frame transmission, and $T_c$ as the average time the medium is sensed busy for a collision. Denote l as the average payload size for a data frame and $\sigma$ represents the minimum duration of a physical time slot (for carrier sensing only). Then the saturation throughput, denoted as S, can be expressed as the ratio of the effective payload transmitted in a time slot to the average time used for such a transmission.

$$S_{N,M} = \frac{l \cdot P_{succ}(N,M)}{\frac{M}{N} \cdot \sigma + T_s \cdot P_{succ}(N,M) + T_c \cdot P_{coll}(N,M)} \quad (4)$$

The size of triggering set $|Q_T|$ should be tuned adaptively to the congestion level of the wireless channel. Intuitively, if there are many stations contending for the channel simultaneously, a station should decrease $|Q_T|$ to avoid congestion; on the other hand, if the channel is rarely used during the past back-off cycle, a station can attempt to enlarge $|Q_T|$ to improve the channel efficiency. In fact, equation (4) indicates that the system throughput can be optimized by properly adjusting the number of TPs (N) in the network for a given fixed back-off window M. However, the exact value of N is difficult to obtain because the number of contending stations and their TPs vary over time. In order to avoid this situation, the congestion level of network is evaluated by examining the number of busy time slots in last back-off cycle.

The congestion index $\phi$ is defined herein as the ratio of the number of observed busy time slots m to the total M time slots in a back-off cycle, i.e., $$\phi = \frac{m}{M}.$$

Intuitively if more TPs involve in the channel contention, more busy slots should be observed. Thus the value of φ reflects the congestion level of the network. Some concerns are:

1) which value of φ would lead to optimal system throughput?

2) given observed φ, how to adaptively change $|Q_T|$ to improve the system performance?

Suppose that a station has observed m busy time slots in last back-off cycle, and assume that the possible maximal number of TPs is M. M is also the maximum number of triggering points, which could also be the total number of time slots. Note that although m busy slots were observed in last back-off cycle, the exact number of TPs is not known since some busy slots may be caused by simultaneous transmission of two or more TPs. A variable W is used to represent the actual number of TPs in the network. By Bayes' formula, the probability that W takes on N given m observed busy slots, P{W=N|m}, can be written as $$P\{W = N \mid m\} = \frac{P\{m \mid W = N\} \cdot P\{W = N\}}{\sum_{j=m}^{M} P\{m \mid W = j\} \cdot P\{W = j\}} \quad (5)$$

Since there is no prior knowledge for the distribution of W, it is assumed that W takes on m, m+1, ..., M with equal probability, i.e. P{W=j}=1/(M−m+1). Thus, the only thing that needs to be computed is the term P{m|W=j}, which is the probability that m out of M time slots are selected by j TPs. Again, by the inclusive-exclusive principle, it follows that $$P\{m \mid W = j\} = \binom{M}{m}\left(\frac{m}{M}\right)^j \sum_{i=0}^{m} (-1)^i \binom{m}{i}\left(\frac{m-i}{m}\right)^j \quad (6)$$

The system throughput when W=N is given by $S_{N,M}$ in (4). Hence, the expected throughput when m busy time slots are observed can be derived as $$\bar{S}_M(m) = \sum_{N=m}^{M} S_{N,M} \cdot P\{W = N \mid m\} \quad (7)$$

Figure 2:
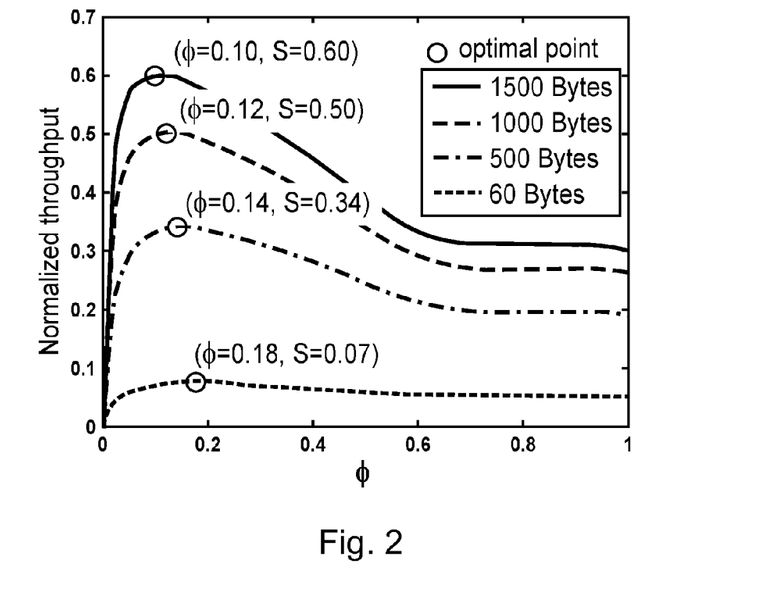
FIG. 2 is a graph of saturation throughput vs. the congestion index $\phi$ for different packet sizes.

It should be noted that m=Mφ. Hence the relationship between system throughput $\bar{S}$ and congestion index φ can now be established. In FIG. 2 is a graph showing how $\bar{S}$ evolves with φ. It can be seen for a given packet size, that there exists an optimal point $\phi_{opt}$ where system throughput is maximized, and the optimal point $\phi_{opt}$ only slightly increases with a decrease of packet sizes.

An adaptive control algorithm is needed so as to have congestion index φ maintained around the optimal point $\phi_{opt}$. The challenge is, as indicated in FIG. 2, $\phi_{opt}$ varies with packet size l, which cannot be captured accurately in a practical system. To overcome this problem, an optimal point which corresponds to the minimum packet size 60 bytes, $\phi_{opt}$=0.18 is selected as the target congestion index. The choice is made based on the observation that, for larger packet sizes of 1000 or 1500 bytes, the system throughput is still near-optimal at point $\phi_{opt}$=0.18.

The congestion index φ is maintained oscillating around the target point $\phi_{opt}^{target}$=0.18 by controlling the size of triggering set $|Q_T|$. The additive increase multiplicative decrease (AIMD) algorithm is employed because of its good fairness performance. The AIMD method works as follows. When too few busy time slots were observed in last back-off cycle, indicating a small congestion-index ($\phi<\phi_{opt}^{target}$), $|Q_T|$ is additively increased, which, in turn, increases the congestion index φ. If too many busy time slots were observed in last back-off cycle ($\phi>\phi_{opt}^{target}$), $|Q_T|$ is decreased multiplicatively to reduce φ (if $|Q_T|$ is still larger than the minimum $q_{min}$=1). This yields the following algorithm.

---

$\phi_{opt}^{target}$: the targeting congestion index
For each back-off round do
    φ: congestion index observed in last back-off round
    If $\phi < \phi_{opt}^{target}$ Then $|Q_T| \leftarrow |Q_T| + \alpha$     Else $|Q_T| \leftarrow \max\left(\frac{|Q_T|}{\beta}, Q_{min}\right)$

---

Other methods, exponential increase exponential decrease (EIED), additive increase additive decrease (AIAD) and multiplicative increase multiplicative decrease (MIMD), including the combination of these algorithms, can also be employed here. These methods are described in detail in EP Application Serial Number EP 09305479.9 filed 26 May 2009.

Figure 5A:
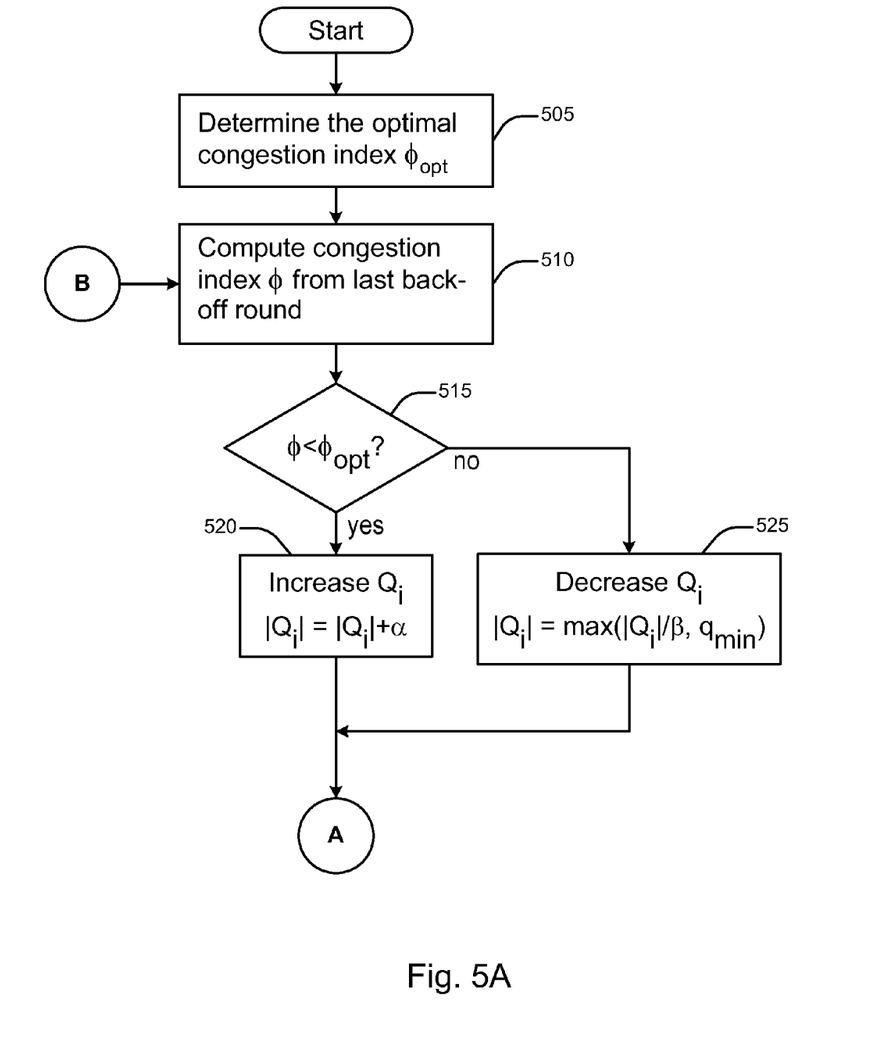
FIGS. 5A and 5B together are a flowchart of the back-off method of the present invention as executed in a mobile device/terminal.
Figure 5B:
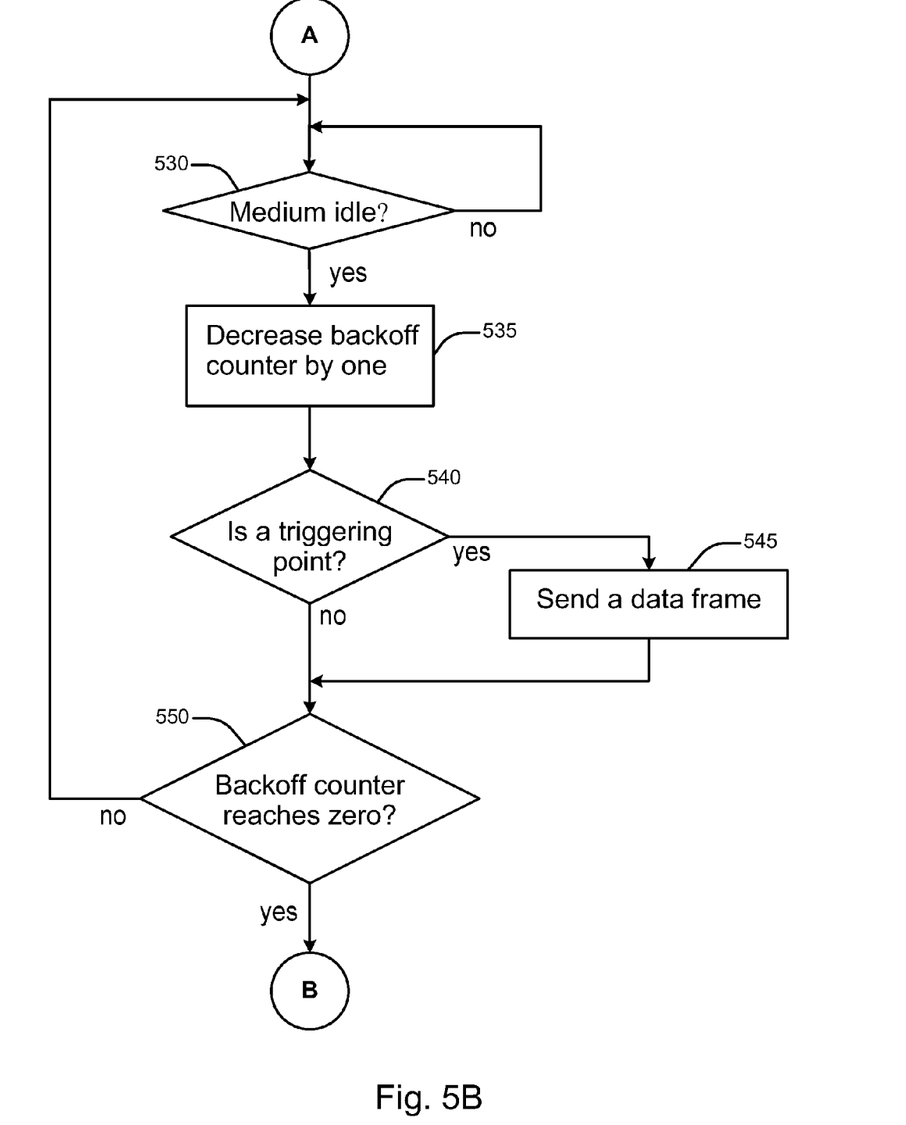

In FIG. 5A and FIG. 5B operation of the AIMD control method is shown and the back-off procedure respectively. In FIG. 5A, a station first determines the optimal congestion index $\phi_{opt}$ at 505. Then at 510, the station computes the congestion index φ responsive to the observed number of busy time slots in previous back-off cycle. At 515, a test is performed to determine if the observed congestion index φ is smaller than the optimal index $\phi_{opt}$. If φ is smaller than $\phi_{opt}$ then at 520, the size of the triggering set $|Q_i|$ is increased additively by a factor α. Otherwise if φ is larger than or equal to $\phi_{opt}$ then at 525, $|Q_i|$ is decreased multiplicatively by a factor of β. However, at test 525, $|Q_i|$ cannot be smaller than a minimal size $q_{min}$. In FIG. 5B, in each time slot, the station performs carrier sense to determine if the medium is idle at 530. If the medium is not idle, then this process repeats in next time slot. If the medium is idle, then the station decreases its back-off counter by one at 535. Further at 540, a test is performed to determine whether the back-off counter is a triggering point in the triggering set $Q_i$. If the back-off counter is a triggering point, then at 545, the station can get an opportunity to send a frame. Otherwise, this station does nothing and leaves this slot idle. At 550 another test is performed to determine whether the back-off counter has reached zero. If the back-off counter has not reached zero, then processing proceeds to 530 and this back-off procedure repeats. If the back-off counter has reached zero, then processing proceeds to 510 to start a new back-off cycle.

Figure 6:
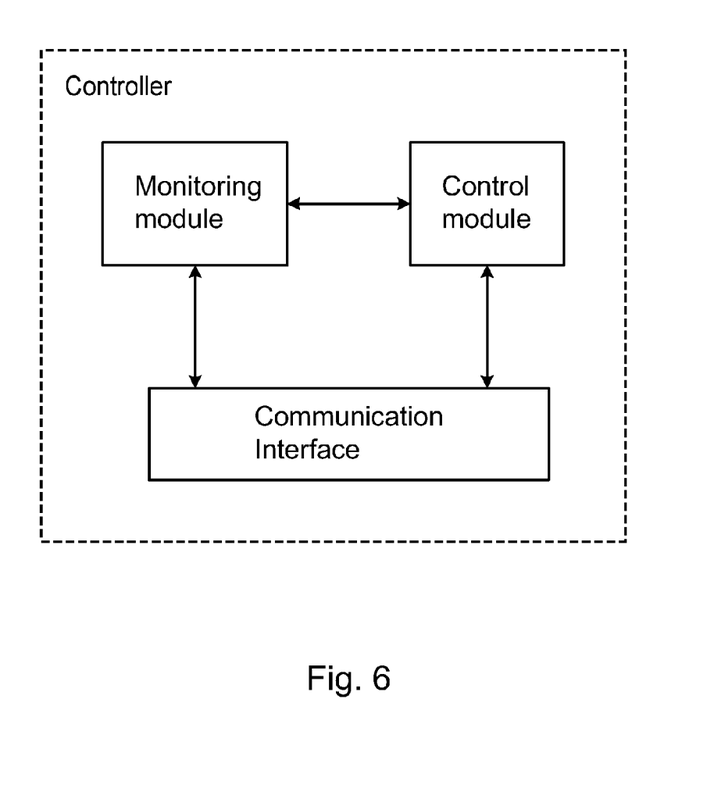
FIG. 6 is a block diagram of an exemplary implementation of the present invention with implementation in a distributed manner (in the stations).

The methods in the present invention can be implemented in a central controller or implemented in a distributed manner. If the method is implemented in a central controller, the central controller can be hosted in the gateway, a mesh node or a separate node connected to the wireless mesh network. The separate node can be in the mesh network or in the wired network connected to the mesh network. Referring to FIG. 6, which is a block diagram of an exemplary implementation of the present invention with implementation in a distributed manner (in the stations). The monitoring module collects the network state information from the mesh nodes through the communication module. The control module runs at least one embodiment of the present invention as a routine to control network congestion by adaptively maintaining the size of the triggering set, which contains the events/conditions that permit/allow a mobile device/terminal to transmit data. The control module sends the instructions for the determined triggering set size and the events/conditions to be included in the triggering set. The triggering set size is based in sparseness, the amount of data in transmission buffers of the mobile devices associated with the network and network/system fairness.

Figure 7:
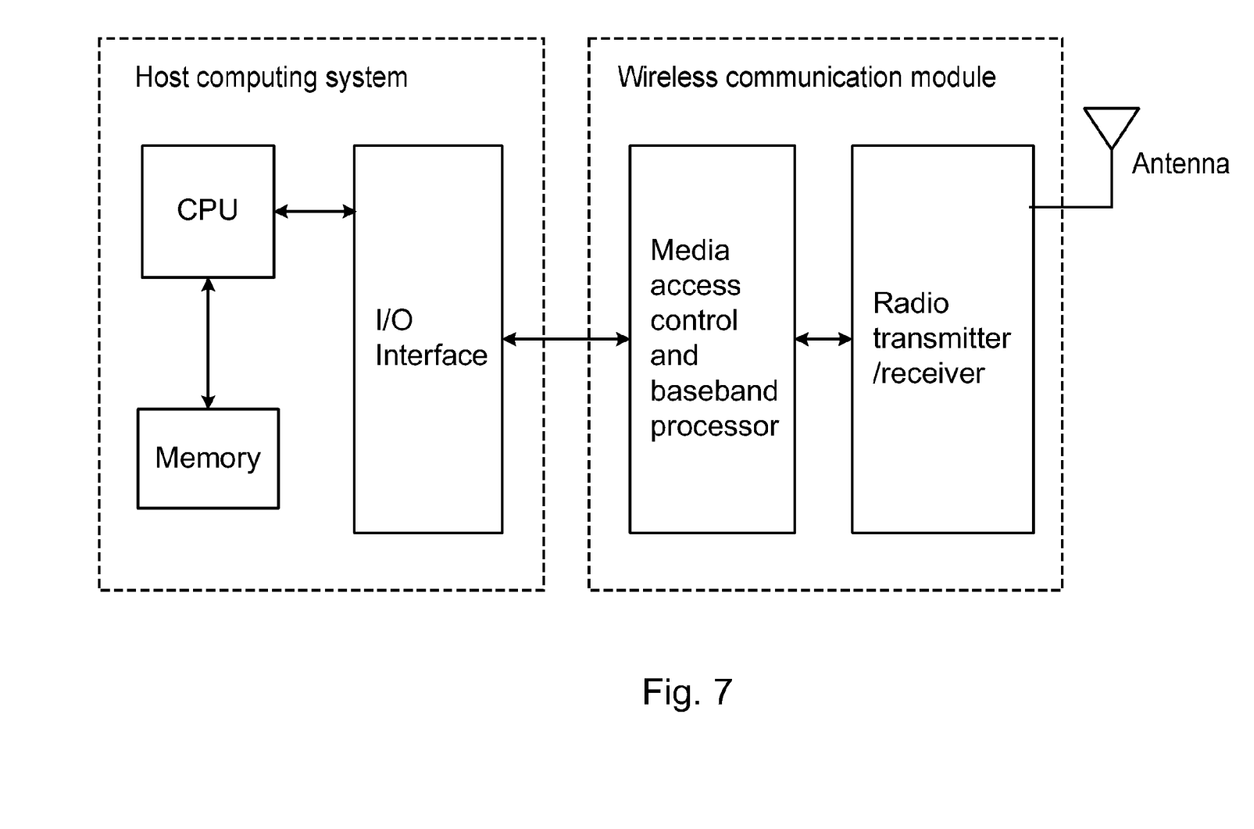
FIG. 7 is a block diagram of an exemplary implementation of the mesh node (station/mobile device/mobile terminal/client device) in accordance with the present invention.

Referring to FIG. 7, which is a block diagram of an exemplary implementation of the mesh node (station/mobile device/mobile terminal/client device) in accordance with the present invention. The mesh node includes a host computing system and one or more wireless communication modules. The host processing system can be a general-purpose computer or a specific-purpose computing system. The host computing system can include a central processing unit (CPU), a memory and an input/output (I/O) interface. The wireless communication module can include a media access control (MAC) and baseband processor, radio transmitter and/or receiver. The radio transmitter and/or receiver may be a radio transceiver or a separate radio transmitter and radio receiver. An antenna transmits and receives radio signals. The radio transmitter and/or receiver perform radio signal processing. The MAC and baseband processor performs MAC control and data framing, modulation/demodulation, coding/decoding for the transmission/receiving as well as adaptively maintaining the size of the triggering set and the events/conditions included in the triggering set. The wireless communication module network measures congestion, the amount of data in the transmission buffers of the mobile devices in the network, and system/network fairness.

At least one embodiment of the present invention can be implemented as a routine in the host computing system or in the wireless communication module of the mesh node to adaptively maintain the size of the triggering set and the events/conditions included in the triggering set.

The block diagrams of FIGS. 6 and 7 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagrams thus fully enable the various methods/processes to be practiced in hardware, software, firmware, a field programmable gate array (FPGA), an application specific integrated circuit (ASIC), a reduced instruction set computer (RISC) or any combination thereof.

Below simulation results are presented to validate the effectiveness of CWB, in comparison with three other random back-off methods known in the art, MILD, MIMLD and IEEE 802.11 DCF. The simulation models a wireless LAN consisting of an AP and multiple mobile stations. All traffics are unicast UDP streams, with the packet size fixed to 1000 Bytes. The IEEE 802.11b DSSS is chosen as the physical layer, with a data rate of 11 Mbps. In addition, RTS/CTS is disabled. No channel errors are considered. For MIMLD, parameters from the literature are used; for CWB, the back-off window is set at M=512, and the control parameters $\alpha=1$, $\beta=1.5$. Other simulation parameters are set to default values as used by ns-2 according to IEEE 802.11 standards.

Figure 3:
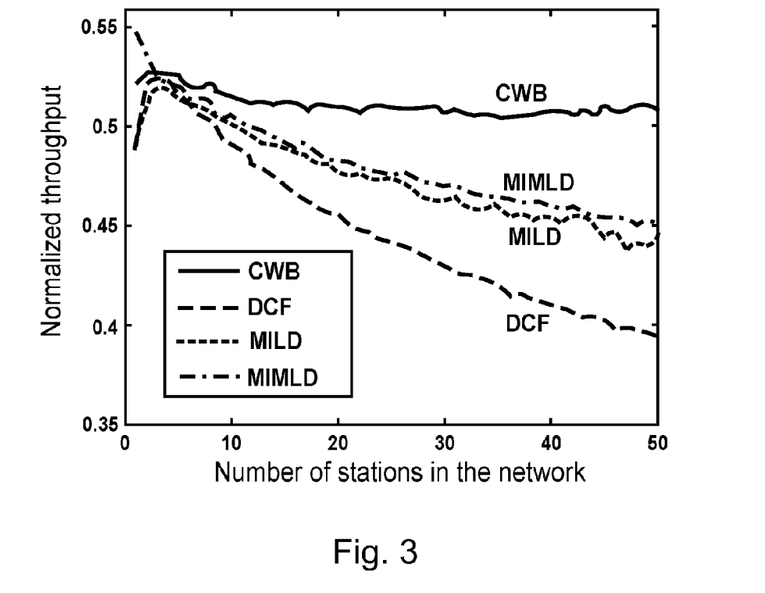
FIG. 3 is a graph of the throughput performance of the method of the present invention and three other conventional back-off methods.

In FIG. 3 the throughput of CWB in a network where the number of stations changes from 1 to 50 was investigated. Each station generates saturated traffic to the AP. As shown in this figure, among the four methods, CWB exhibits the best performance in the sense that its throughput is maintained on the optimal level across all network sizes, whereas the other three back-off methods have a decrease in throughput for large network size. However, for small network sizes (smaller than 3), MIMLD outperforms CWB. This is simply because the MIMLD uses the smallest back-off window in this case (its back-off window can be as small as 2). For a larger network size, the throughput of CWB is greater/better than that of the other three methods, and the throughput/performance gap increases with the network size. FIG. 3 also demonstrates that the CWB is not sensitive to the number of stations in the network—the throughput in sparse case is only slightly larger than that in dense case. This further shows the scalability of the CWB method of the present invention.

Figure 4:
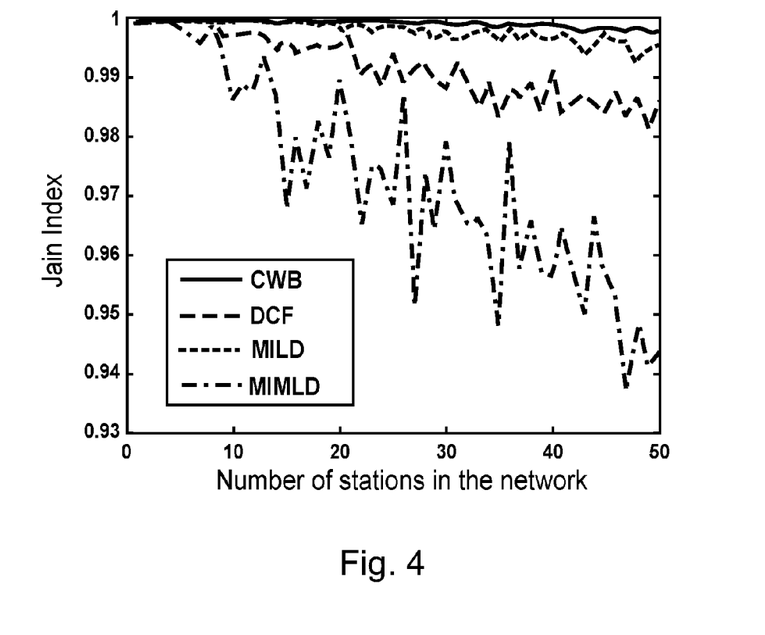
FIG. 4 is a graph of the fairness performance of the method of the present invention and three other conventional back-off methods.

In FIG. 4 the fairness performance of four back-off methods is presented. Using the normalized Jain index as fairness metric, results show that CWB has the best fairness performance, even compared with MILD. Note that MILD employs dedicated online copying mechanism between stations to allow stations in the network to maintain the same contention window so as to achieve fair channel access. In contrast in the CWB method of the present invention, only the AIMD control method is used to achieve fairness, which is performed locally without the need of communication with neighbors.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method of managing media access control level communications in a wireless network, said method comprising:
    determining, by a controller, a target congestion index associated with maximizing data transmission opportunities for at least one contending station during a back-off round;
    determining, by the controller, a congestion index based on information representing an observed number of busy time slots from a last back-off round;
    comparing said target congestion index with said congestion index; and performing one of increasing a triggering set size by a first factor and decreasing said triggering set size by a second factor responsive to said comparison, wherein the triggering set size defines the number of transmission opportunities for the at least one contending station in a subsequent back-off round.

2. The method according to claim 1, wherein said increasing act is one of additive, multiplicative and exponential.

3. The method according to claim 1, wherein said decreasing act is one of additive, multiplicative and exponential.

4. The method according to claim 1, wherein said decreasing act cannot result in said triggering set size below a minimum size.

5. The method according to claim 1, further comprising:
   determining if a communications medium is idle;
   adjusting a back-off counter responsive to said third determining act;
   determining if said back-off counter is equal to a triggering point in said triggering set; and
   transmitting data responsive to said fourth determining act.

6. The method according to claim 5, wherein said adjusting act comprises decreasing said back-off counter by one.

7. An apparatus for managing media access control level communications in a wireless network, comprising: means for determining a target congestion index associated with maximizing data transmission opportunities for at least one contending station during a back-off round; means for determining a congestion index based on information representing an observed number of busy time slots from a last back-off round; means for comparing said target congestion index with said congestion index; means for performing one of increasing a triggering set size by a first factor and decreasing said triggering set size by a second factor responsive to said comparison, wherein the triggering set size defines the number of transmissions opportunities for the at least one contending station in a subsequent back-off round.

8. The apparatus according to claim 7, wherein said means for increasing is one of additive, multiplicative and exponential.

9. The apparatus according to claim 7, wherein said means for decreasing is one of additive, multiplicative and exponential.

10. The apparatus according to claim 7, wherein said means for decreasing cannot result in said triggering set size below a minimum size.

11. The apparatus according to claim 7, further comprising:
    means for determining if a communications medium is idle;
    means for adjusting a back-off counter responsive to said third determining act;
    means for determining if said back-off counter is equal to a triggering point in said triggering set; and
    means for transmitting data responsive to said fourth determining act.

12. The apparatus according to claim 11, wherein said means for adjusting comprises means for decreasing said back-off counter by one.

* * * * *